United States Patent [19]
Migeon

[11] 3,922,559
[45] Nov. 25, 1975

[54] DOUBLED PARALLEL ELECTRIC POWER SOURCES

[75] Inventor: René Migeon, Boulogne Billancourt, France

[73] Assignee: Compagnie Industrielle des Telecommunications Cit-Alcatel, Paris, France

[22] Filed: Sept. 24, 1974

[21] Appl. No.: 508,943

[30] Foreign Application Priority Data
Sept. 27, 1973 France .............................. 73.34631

[52] U.S. Cl. .................................. 307/64; 317/9 R
[51] Int. Cl.² .......................................... H02J 9/00
[58] Field of Search .............. 307/43, 64; 340/333; 317/16, 23, 9 D, 9 R

[56] References Cited
UNITED STATES PATENTS
3,424,995   1/1969   Parente .................. 307/64 X Primary Examiner—James R. Scott
Assistant Examiner—M. Ginsburg
Attorney, Agent, or Firm—Sughrue, Rothwell, Mion, Zinn & Macpeak

[57] ABSTRACT

The invention refers to continuous electrical power sources for transmission equipment. It concerns a safety device for an assembly comprising two sources, giving a virtually instantaneous reversing to one of the sources if the other, previously set in operation, has a breakdown.

3 Claims, 1 Drawing Figure

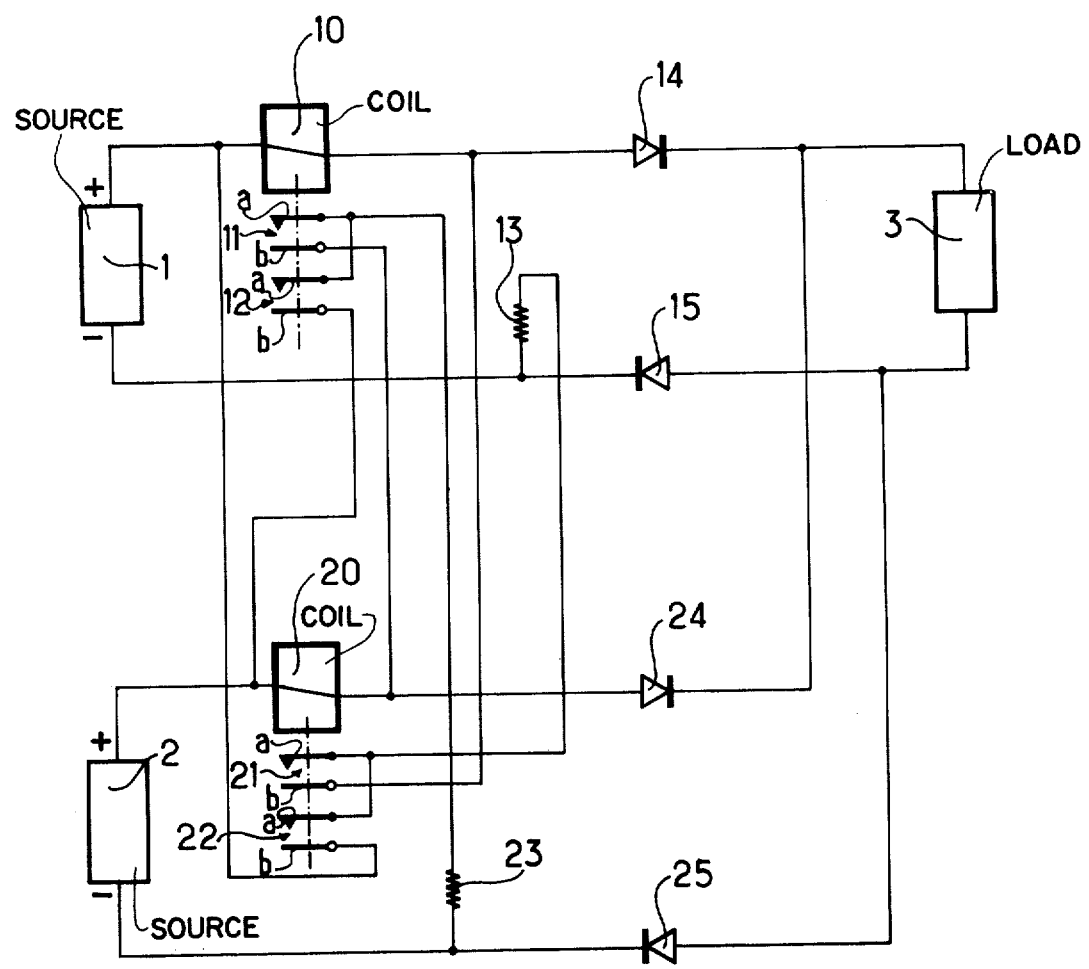

DOUBLED PARALLEL ELECTRIC POWER SOURCES

The present invention relates to doubled parallel electrical power source equipment in which one of the power sources is intended to substitute the other in the case of failure of the latter.

Such equipment is known per se. In a general way, one of the power sources is intended for the normal supplying of a load, whereas the other, called the emergency source, not delivering current during the normal operation of the first, substitutes the first when there is a failure of the latter under the control of a decision element.

This substituting of power sources requires a response time of the equipment corresponding more particularly to the detection time of the failure of the normal source and to the switching time of the emergency source on the load; fluctuations in voltage at the terminals of the load appear during that response time, even if it is made short.

The aim of the present invention is, in a doubled electrical power source equipment, to make the substituting of one of the supply systems by the other automatic and practically instantaneous, to avoid the above drawbacks.

The present invention has for its object a power supply equipment having two electrical power sources in parallel comprising switching means for connecting either one source or the other on a load, characterized in that these switching means are constituted, for each of said supply sources, by relay having two contacts of the same type, whose coil is connected in series between one of the sources and the load and a first of whose contacts connected, in series with an auxiliary load, between the terminals of the other source, and whose second contact is connected in parallel with the other relay coil connected in series between the other source and the said load.

The advantage of the present invention resides in the fact that the two power sources deliver current simultaneously: one of them supplies the load; the other supplies the auxiliary load. The pre-established current which this latter source delivers is available instantaneously for the supplying of the load and for energizing the relay which is connected with it, when there is a breakdown of the first source, which can then discharge only in the auxiliary load which is connected with it.

Other characteristics and advantages of the present invention will become apparent from the description of an embodiment, chosen by way of an example, illustrated diagrammatically in the single FIGURE of the accompanying drawing.

In the FIGURE, the supply equipment comprises two supply sources 1 and 2, in parallel, called supply generators, having the same characteristics; the load to be supplied is shown at 3.

A first relay having two make contacts, whose coil 10 is in series between the source 1 and the load 3, is connected with the generator 1. That coil 10 controls the two contacts 11 and 12 of the first relay. That coil 10 is energized by the normal current sent out by the generator 1.

A second relay having two make contacts, whose coil 20 is connected in series between the source 2 and the load 3, is connected with the generator 2. That coil 20 controls the two contacts 21 and 22 of that second relay. The coil 20 is energized by the current of the generator 2 during the normal operation of the latter.

The fixed armatures, designated by the letter a, of the contacts 11 and 12 are connected in common to an auxiliary load 23 associated with the generator 2 and connected to one of its terminals (terminal −). One of the controlled mobile armatures designated by the letter b, (12b) of these contacts 11 and 12 is connected between the other terminal of the generator 2 (terminal +) and the coil 20; the other mobile armature (11b) of these contacts 11 and 12 is connected to the other terminal of the coil 20.

The fixed armatures, also designated by the letter a, of the contacts 21 and 22 are connected in common to an auxiliary load 13 associated with the generator 1 and connected to one of its terminals (terminal −). One of the controlled mobile armatures, designated by the letter b, (22b) of the contacts 21 and 22 is connected between the other terminal of the generator 1 (terminal +) and the coil 10; the other mobile armature (21b) of these contacts 21 and 22 is connected up to the other terminal of the coil 10.

Two first diodes 14 and 15 are connected in their conductive direction respectively between the terminals of the generator 1, in series with the coil 10 and the terminals of the load 3; in a like manner, two other diodes 24 and 25 are connected in their conductive directions respectively between the generator 2, in series with the coil 20 and the terminals of the load 3. They are connected to enable the feeding of the load 3 from one or the other of the generators 1 and 2, while preventing the return of the current from one of the generators into the other.

The operation of the circuitry is as follows:

When one of the generators, the generator 1, for example, discharges into the load 3, the relay 10-11-12 which is connected with it is in the make position: by its contacts 11 and 12, it causes on the one hand, the generator 2 to supply auxiliary load 23 (contact 12 closed) and on the other hand, coil 20 to be short-circuited, relay 20-21-22 being therefore in the break position.

If a failure of the generator 1 occurs, the coil 10 is no longer energized and the related contacts 11-12 are simultaneously set to the break position; the generator 2 is no longer connected up to the auxiliary load 23 but it delivers current in the load 3. The relay 20-21-22 set to the make position causes generator 1 to supply auxiliary load 13 which is connected with it and the coil 10 of the relay 10-11-12 set to the break position to be short-circuited.

This substituting of the generators 1 and 2 on the load 3 occurs practically instantaneously: the energizing current of each of the coils of the relays being pre-established due to the fact that generators 1 and 2 simultaneously deliver current respectively in the load 3 and the related auxiliary load 13 or 23. The response time of the relays does not, therefore, take part in the response time of the equipment and the load 3 is supplied permanently in similar conditions.

Numerous applications are found for the present invention, more particularly in remote supply systems for telephonic connection equipment using submarine cables.

The present invention has been described with reference to an embodiment chosen by way of an example; it is obvious that details may be changed and/or that certain means may be replaced therein by others which are technically equivalent, without forasmuch going beyond the scope of this invention.

What is claimed is:

1. A safety device for the continuous transmission of electrical power to a load comprising: first and second electrical power sources, means connecting said sources in parallel to the load, first and second auxiliary loads connected in series with said first and second power sources, respectively; switching means disposed between said power sources and said auxiliary loads for selectively coupling said sources to said load or said respective auxiliary loads; said switching means comprising first and second relays and coils, said first relay having at least two contacts, said first coil connected in series between said first source and the load, the first contacts of said first relay connected in series with said second source and said second auxiliary load, the second contacts of said first relay connected in parallel with said second coil; said second relay having at least two contacts, said second coil connected in series between said second source and the load, the first contacts of said second relay connected in series with said first source and said first auxiliary load and the second contacts of said second relay connected in parallel with said first coil.

2. A safety device according to claim 4, in which two identical armatures of the contacts of each relay associated with one of said sources are connected in common to the auxiliary load associated with the other source.

3. A safety device according to claim 1 wherein the connecting means comprises first and second means for preventing the electrical power sources from delivering current to each other.

* * * * *